United States Patent [19]

Boldt et al.

[11] Patent Number: 4,491,872
[45] Date of Patent: Jan. 1, 1985

[54] ULTRA-COMPACT PROJECTION TELEVISION RECEIVER

[75] Inventors: Melvin H. Boldt, Glenview; James W. Schwartz, Deerfield, both of Ill.

[73] Assignee: Zenith Electronics Corporation, Glenview, Ill.

[21] Appl. No.: 459,004

[22] Filed: Jan. 17, 1983

Related U.S. Application Data

[63] Continuation of Ser. No. 228,434, Jan. 26, 1983, abandoned.

[51] Int. Cl.³ .............................................. H04N 5/74
[52] U.S. Cl. ................................... 358/237; 358/254
[58] Field of Search ............................ 358/237, 254

[56] References Cited

U.S. PATENT DOCUMENTS 2,476,494 7/1949 Jones ................................. 358/254
4,209,807 6/1980 Arita ................................. 358/237
4,245,256 1/1981 Kokubo ............................. 358/254
4,281,352 7/1981 Hoffman ........................... 358/237

Primary Examiner—Michael A. Masinick
Attorney, Agent, or Firm—Cornelius J. O'Connor

[57] ABSTRACT

An ultra-compact projection television receiver is disclosed comprising cabinet means for enclosing the components of the receiver. The receiver has vertically arranged elevatable rear projection screen means selectively storable in the receiver. Means are included for elevating the screen means from a first receiver-inoperable position wherein the screen means is stored in the cabinet and the receiver is substantially as compact as a conventional large-screen console television receiver. In a second, elevated receiver-operable position, the screen means is emerged from the cabinet and is capable of displaying an image with an area greater than three times the image area on a conventional console television receiver.

2 Claims, 9 Drawing Figures

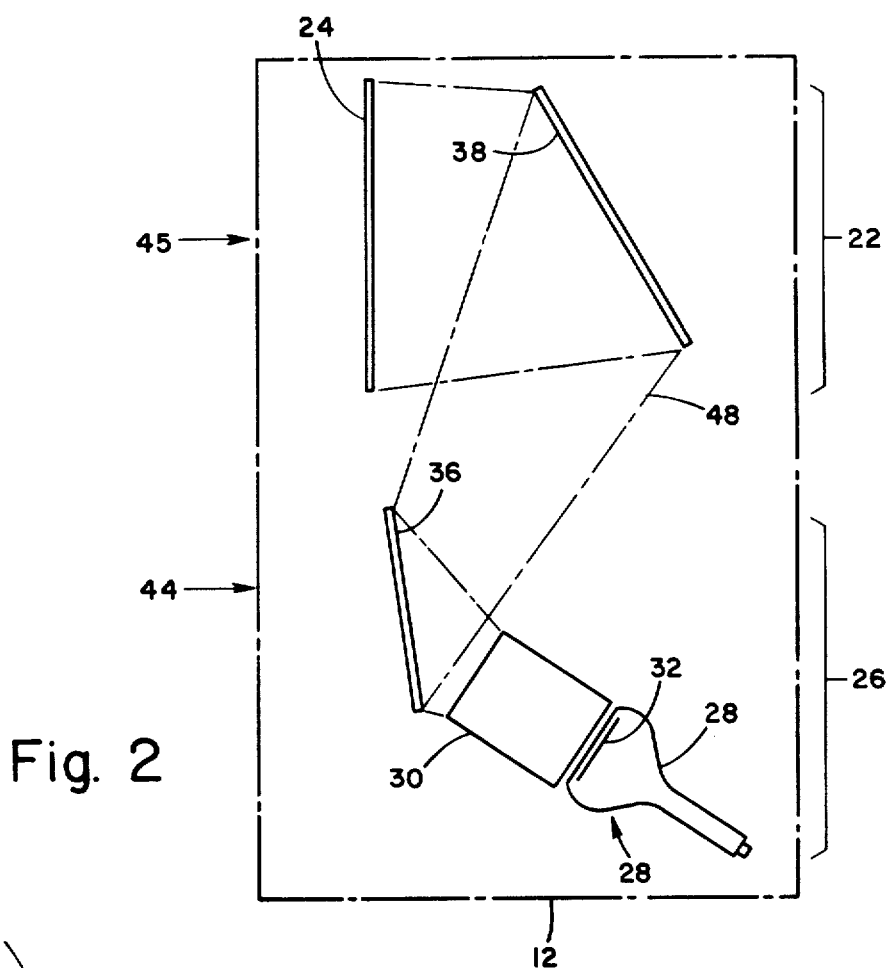
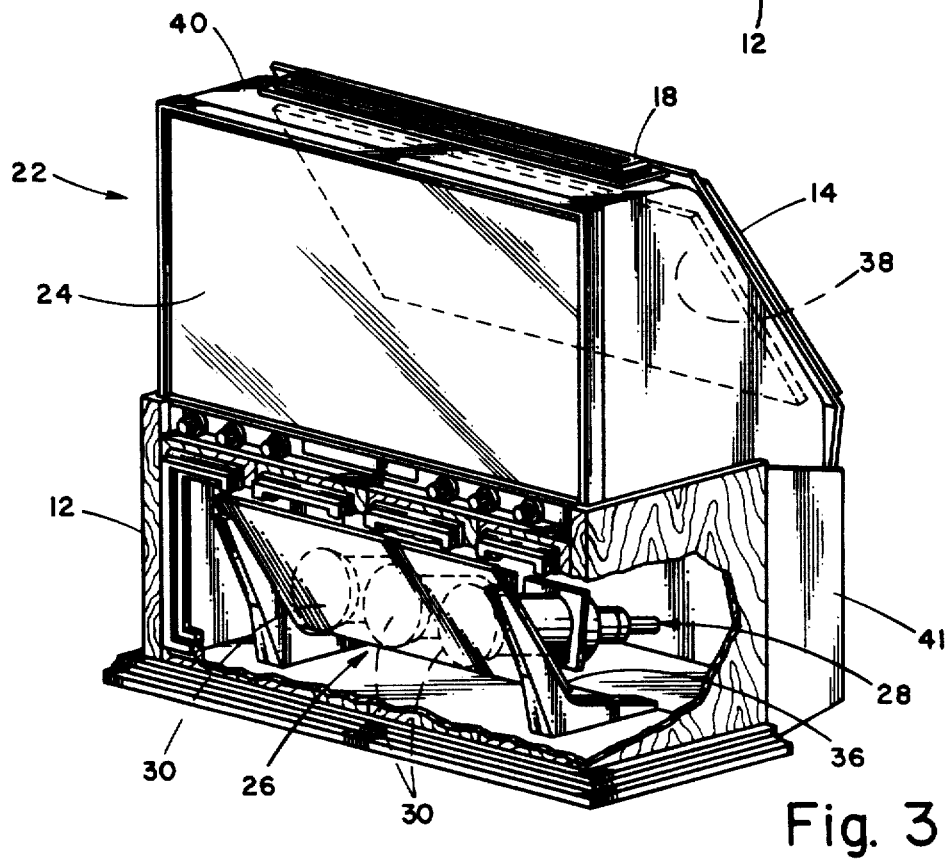

ULTRA-COMPACT PROJECTION TELEVISION RECEIVER

CROSS-REFERENCE TO RELATED APPLICATIONS

This application is a continuation of application Ser. No. 228,434 filed Jan. 26, 1983, now abandoned.

This application is related to but in no way dependent on copending applications of common ownership herewith including: Ser. No. 259,333 filed 4-30-81, now U.S. Pat. No. 4,349,845; Ser. No. 314,591 filed 10-26-81, now U.S. Pat. No. 4,400,723; Ser. No. 238,861 filed 2-27-81, now U.S. Pat. No. 4,385,313; Ser. No. 258,206 filed 4-27-81, now U.S. Pat. No. 4,394,681; and Ser. No. 297,885 filed 6-16-81, now U.S. Pat. No. 4,386,372.

BACKGROUND OF THE INVENTION AND PRIOR ART DISCLOSURES

This invention concerns television receivers and is particularly directed to systems in which the television image is projected on a viewing screen greater in area than the screen of the conventional console television receiver.

The size of the imaging screen of the cathode ray tube is limited to a practical maximum of about 25 inches (diagonal measure). While cathode ray tubes as large as 35 inches in diagonal measure have appeared in consumer products, the tube envelope becomes so big and unwieldy that any benefit resulting from the increase in screen size is offset by the great increase in cost, size and weight. In addition, brightness and resolution fall off rapidly with relatively small increments of increase in screen size much beyond 25 inches.

As a result, attempts to provide increased screen sizes have been directed mainly to projection systems. In many kinds of projection television systems, the television image is formed on the cathodoluminescent screens of a plurality of monochrome color cathode ray tubes providing discrete red, green and blue images, for example, and the images are combined and focused on a remotely located viewing screen by an arrangement of lenses and mirrors. Viewing screen sizes are typically in the range of 40 to 72 inches in diagonal measure.

The simplest type of projection television system is one in which the image on the screen of a television receiver, usually of the small-screen type, is magnified by a simple projection lens embodied in a housing that shields the screen. The enlarged image is normally projected onto a reflecting screen, although the image may as well be directed towards a rear-projection screen that forms a part of the housing. The brightness of the projected image is enhanced by increasing the intensity of the image on the receiver screen by electronic means, and by using a directional screen.

Three other basic projection system configurations have appeared in the market place. One is a two-piece system comprising a free-standing projection unit physically separated from a remotely located viewing screen. One commercially available model of this type has a screen of 72 inches in diagonal measure, and has a projection distance of more than eight feet.

Another basic configuration is a system in which a forwardly tilted, curvilinear viewing screen, which may be demountable, is mounted uprightly at the back of a cabinet. The optical assembly, which commonly includes three projection cathode ray tubes and associated focusing lenses, is housed in the cabinet. The optical assembly casts a plurality of images on a mirror which, in preparation for operation, is transported on slide means forwardly away from the screen toward the viewer to a fixed position. The purpose is to reflect the images on the screen where they are brought into coincidence, thus providing the necessary projection distance. The larger the viewing screen, the longer the projection optical path and the closer to the viewer the mirror must extend. In one product of this type, for example, wherein the viewing screen is 60 inches in diagonal measure, the mirror is transported nearly two feet toward the viewer from the cabinet proper. An example of a system of this type is disclosed in U.S. Pat. No. 4,058,837 to Muntz.

A third type is a "rear-projection" system in which the image is projected on the rear of the viewing screen for viewing by an observer located at the front of the screen. An example is the Model PR4800SW manufactured by Quasar Electronics Corp., Franklin Park, Illinois. The system is contained in a single large cabinet the height of a tall china cabinet. The screen is exposed for viewing by opening the doors of the upper section of the cabinet to reveal a screen of 45-inch diagonal measure. Another example of a television set with a fixed rear projection screen is disclosed in U.S. Pat. No. 4,177,484 to Boje.

A very early television set developed by Zenith Radio Corporation (circa 1939) comprised a long cathode ray tube having a screen diagonal measure of about eleven inches mounted vertically in a cabinet. The image on the screen was viewed indirectly by means of a mirror mounted on the under-side of the hinged cabinet lid, with the lid oriented at a convenient angle for viewing.

Projecting television receivers of the large-screen types described, despite the obvious benefit of larger viewing screens, have not received the widespread acceptance accorded the conventional large-screen console television set which commonly has the twenty-five inch screen that is relatively small in area when compared to projection system screens. The massiveness and the extensive floor space required have made most projection systems generally unattractive to the average homeowner who is more used to contemporary home furnishings of the compact type. In addition, the overall incompatability of many projection receivers with such furnishings is accentuated by factors such as an awkward configuration, especially when a system such as a two-piece projection system, is set up for operation. Further, the need in most cases to set up the receiver is not appealing to the homeowner used to pressing a single button to activate his familiar console television set.

OBJECTS OF THE INVENTION

It is a general object of this invention to provide an improved projection television system.

It is a less general object of the invention to provide an ultra-compact projection television system, one that occupies less volume and less floor space than is occupied by current projection television systems.

It is a more specific object of the invention to provide a projection television system which, when inoperative, is self-enclosing in a cabinet similar in appearance and little, if any, larger in size than a conventional large screen television console cabinet.

It is a specific object of the invention to provide a television receiver that combines the benefit of the larger viewing screen of projection systems with the compactness of conventional console television receivers.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

FIG. 2 is a schematic view of the components of the optical path of receiver according to the invention in relation to the receiver cabinet, depicted as an outline;

FIG. 3 is an oblique view in perspective depicting a receiver according to the invention with screen elevated and with the receiver cabinet partially cut away to depict major components;

DESCRIPTION OF THE PREFERRED EMBODIMENT

Figure 1A:
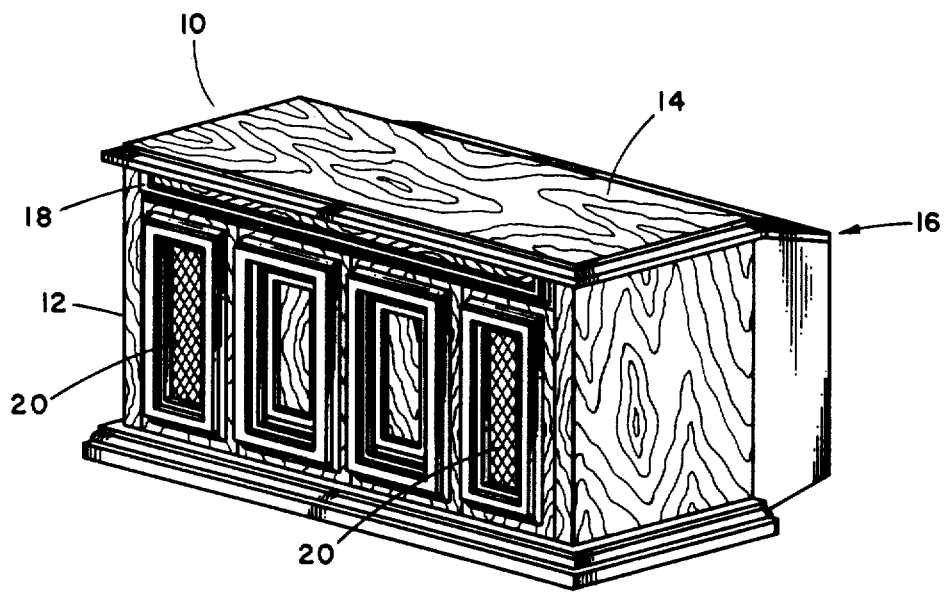
FIGS. 1A and 1B are oblique views in perspective of a projection television receiver according to the invention depicting, respectively, a first receiver-inoperable position, and a second receiver-operable position wherein a rear projection screen is elevated from the receiver cabinet.

An ultra-compact jack-in-the-box projection television receiver 10 according to the invention is shown by FIG. 1A. The receiver comprises cabinet means 12 for enclosing the components of the receiver. Cabinet 12 includes lid means 14 attached to the back of the cabinet and pivoted by a hinge 16 which may comprise a piano hinge, for example. The lid 14 may have an overhanging control panel cover 18 for covering a receiver control panel. Grilled aperture ports 20 provide for audio emission from concealed speakers of, for example, a stereo sound system.

Figure 1B:
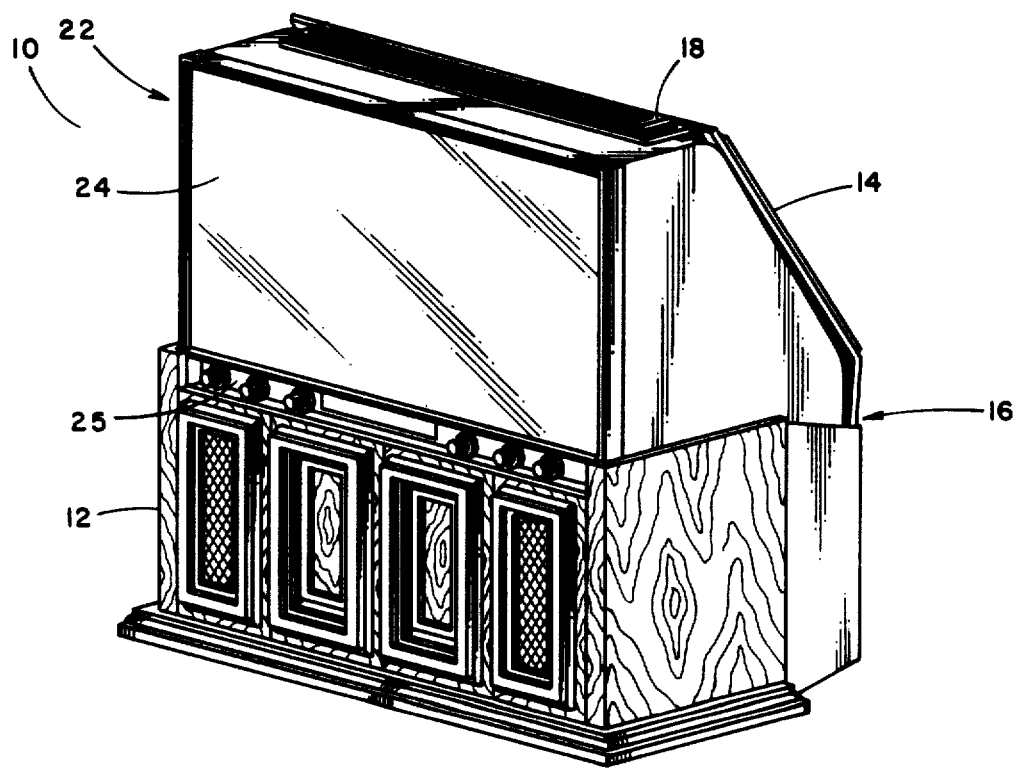

With reference now to FIG. 1B, lid 14 is shown as being raised and elevatable assembly means 22 is shown as being emerged from cabinet means 12. Rear projection viewing screen means 24 which is a part of elevatable assembly means 22, and is selectively storable in cabinet 12, is shown as being vertically arranged for displaying a television image, as will be described. Control panel 25, which may include all standard front panel controls such as controls for channel selection, audio volume, and various chromatic controls, is exposed by the raising of control panel cover means 18 when lid 14 is raised. Control panel cover 18 may be hingedly dependent from lid 14, as indicated. Control panel cover means 18 is described and claimed in referent copending application Ser. No. 259,333 now U.S. Pat. No. 4,349,845.

The major components comprising the television receiver according to the invention are depicted schematically in FIG. 2 and in a cutaway perspective view in FIG. 3. A stationary optical means 26, indicated by a bracket in FIG. 2, is permanently enclosed in a lower portion of cabinet 12 as indicated. Stationary optical assembly 26 includes a television image source means indicated as comprising three cathode ray tubes 28 which may develop, respectively, a red, green, or blue image for forming, with the associated projection lenses 30, an aerial image at a predetermined projection image distance from television from television image source means 26. A television image 32 is depicted in FIG. 2 as being formed on the cathodoluminescent screen of one of the cathode ray tubes. The stationary optical assembly 26 includes first mirror means 36, which provides for receiving the aerial image and reflecting the image upwardly. The optical assembly means 26 is fully described and claimed in referent copending application (D4230).

The elevatable assembly means 22, indicated by a bracket in FIG. 2, includes rear projection screen 24 for displaying the projected television image. A second mirror means 38 provides for receiving the image reflected from first mirror 36, and is arranged to reflect the image forwardly toward screen 24. Shroud means 40 support screen 24 and the second mirror 38 to form a semi-rigid, unitary, opto-mechanical assembly. Shroud 40 also provides for shielding the rear surface of screen 24 from image-contrast-reducing ambient light. Cabinet extension 41 provides additional space for enclosing shroud 40 when the elevatable assembly 22 is stored. The elevatable opto-mechanical assembly which includes screen 24, second mirror 38 and shroud 40, is described and fully claimed in referent copending application Ser. No. 238,861 now U.S. Pat. No. 4,385,313.

Figure 4A:
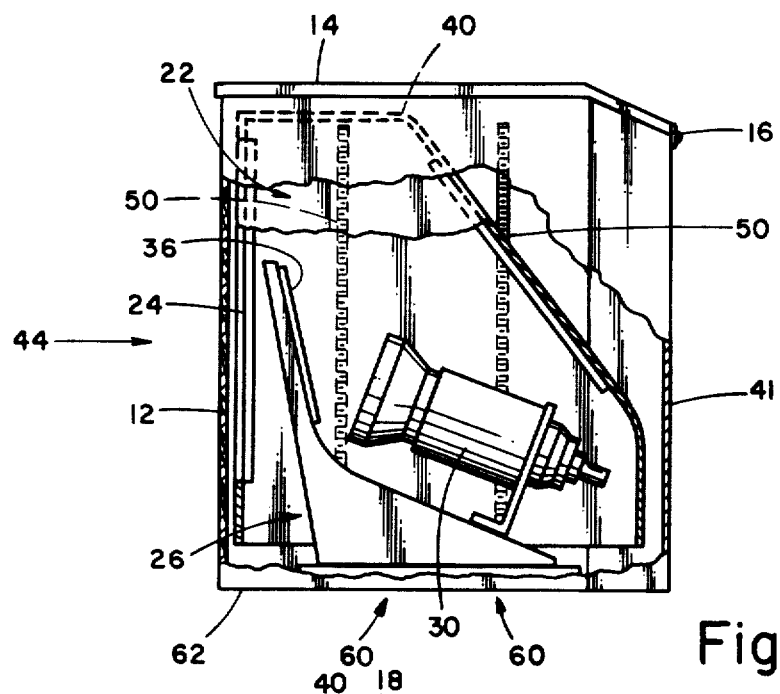
FIGS. 4A and 4B are views in elevation wherein the cabinet of a receiver according to the invention is cut away to show the relationship of major components when the screen is in the unstored and emerged condition, respectively.
Figure 4B:
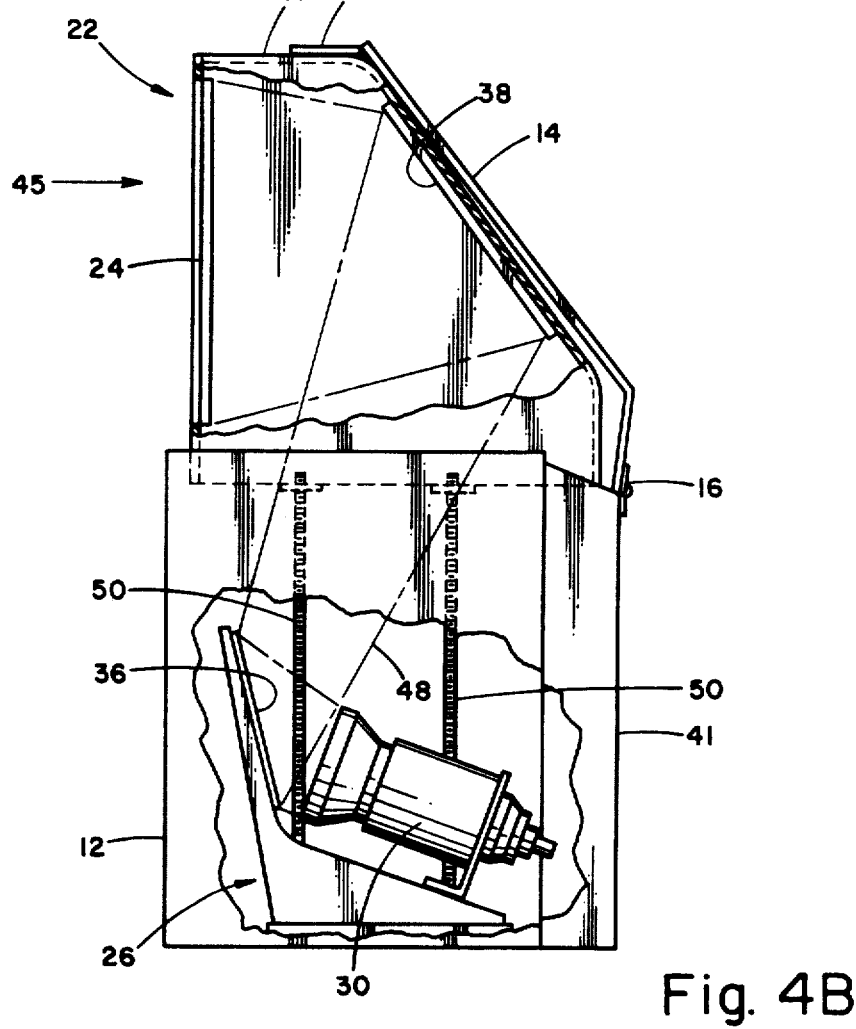

FIG. 4A depicts the location of elevatable assembly 22, which includes screen 24, second mirror 38 and shroud 40 when the receiver according to the invention is in a first receiver-inoperable position 44 wherein the screen means 24 is stored in cabinet 12. When screen 24 of elevatable assembly 22 is in this position, receiver 10 is substantially as compact as a conventional large-screen console television receiver. Means are provided for lifting lid 14 and elevatable assembly 22 including screen 24 to a second elevated receiver-operable position 45 wherein screen 24 is emerged from cabinet 12; this configuration is depicted in FIG. 4B (and also by FIG. 3). When screen 24 is in the receiver-operable position, the receiver 10 is capable of displaying an image with an area greater than three times the image area on a conventional television receiver.

A conventional console television receiver normally has a picture tube with an imaging screen of twenty-five inch diagonal measure. The imaging area is about 300 square inches. The diagonal measure of screen 24 of the projection television receiver according to the invention is, by way of example, about forth-five inches. The screen area, based upon a three-to-four aspect ratio, is about 970 square inches, or greater than three times the imaging area of the aforedescribed conventional large-screen console television receiver.

When elevatable assembly 22 is fully emerged from cabinet 12, the length of the optical path 48 is equal to the aforedescribed projection distance. As a result of the means according to the invention, the projected image is coincident with screen 24. The folded optical system is described and claimed in referent copending application Ser. No. 258,206 now U.S. Pat. No. 4,394,681.

Figure 5:
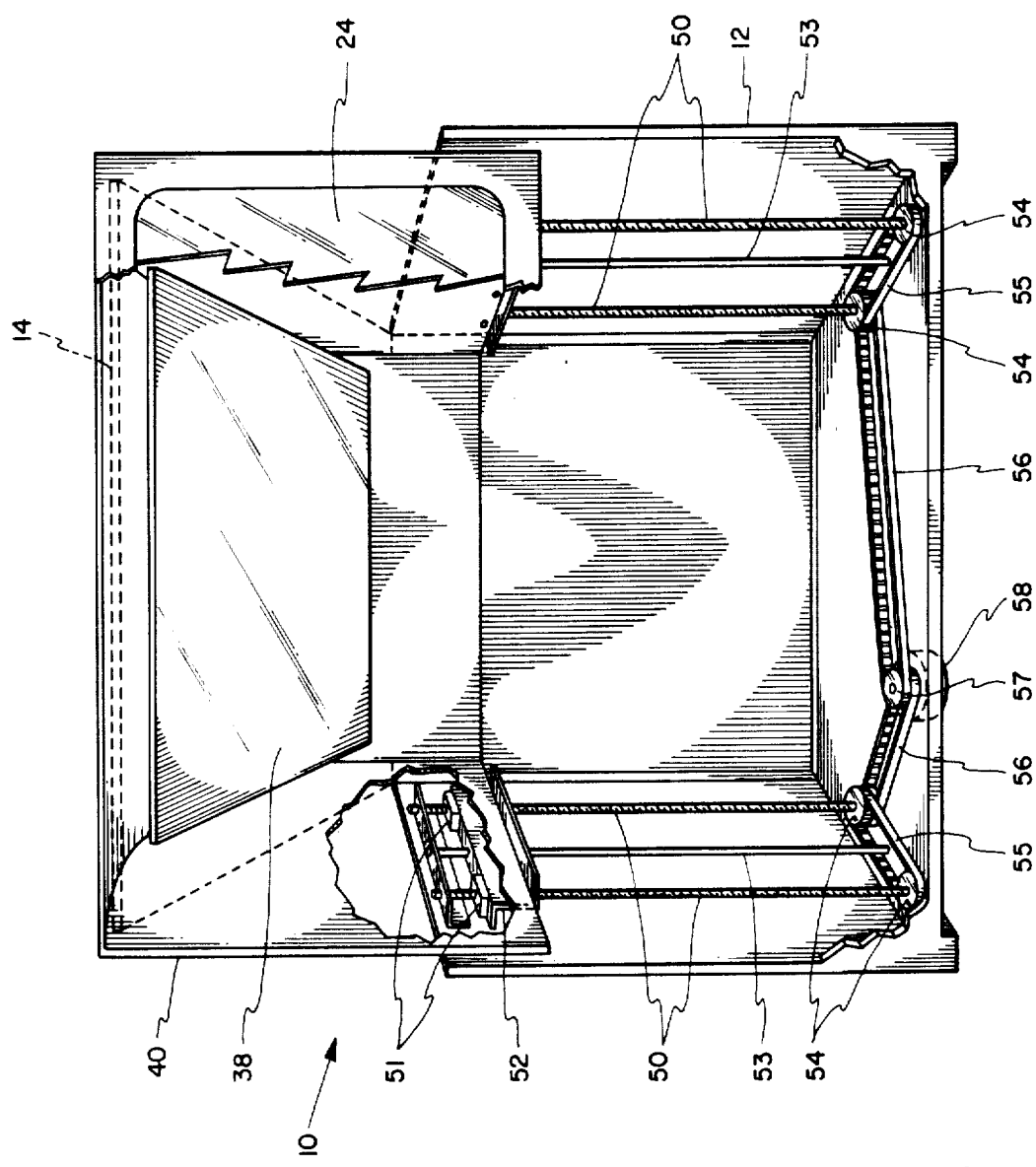
FIG. 5 is a view in perspective with the front of the receiver cabinet and major components cut away to show details of screen elevating means.

FIG. 5 depicts means for lifting lid 14 (indicated by the dash lines) and elevating screen 24 from a first, receiver-inoperable position wherein screen 24 is stored in cabinet 12, to a second receiver-operable position wherein screen 24 is emerged from cabinet 12. Four vertically oriented and vertically stabilized screw means 50 are shown as providing for elevating and lowering screen 24. Shroud 40 is shown as cut away in the left-hand side of FIG. 5 to show details of the elevating means; an identical mirror image assembly is located on the opposite side of the cabinet 12, but obscured by screen 24 and shroud 40.

The rotation of screw means 50 is translated into vertical movement by screw follower means 51 attached to bracket 52, to which shroud 40 is in turn attached. Guide rods 53 provide for vertically stabilizing shroud 40 in its vertical traverse. Screen 24 is depicted as being nearest its raised position.

Screw means 50 are caused to rotate in unison by power train means indicated as comprising screw means drive pulleys 54 which are caused to rotate by drive pulley link belts 55. Drive pulleys 54 are in turn linked by belts 56 to drive pulleys 57 which are rotated by a reversible electrical motor 58. Belts 55 and 56 are depicted as being of the synchronous type for mating with synchronous pulleys 54 and 57, providing positive drive. The elevating means are fully described and claimed in the copending application Ser. No. 297,885, now U.S. Pat. No. 4,386,372.

The elevating of the elevatable assembly 32 and screen 24 from a stored, first receiver-inoperable position wherein screen means 24 is emerged from cabinet 12 results in a large influx of air into cabinet 12, and when assembly 22 is lowered for storing, a large efflux of air. The volume of air entering or leaving cabinet 12 is considerable—about six cubic feet—and the rate of flow is about twenty-four cubic feet per minute on the basis that fifteen seconds is allotted for the full excursion of the screen out of or into, cabinet 12. To provide for the unimpeded passage of air, a series of capacious vents 60 are provided in cabinet 12, preferably in the bottom 62 of cabinet 12 as indicated in FIG. 4A.

The affinity of particulate matter to electronic and optical components, especially those operating adjacent to high potentials and at elevated temperatures, is well known. To remove as many contaminants as possible from the air entering the cabinet, it is desirable to provide filter means in vents 60; these can be of the well known spun-glass type such as used in hot air furnaces.

Figure 6A:
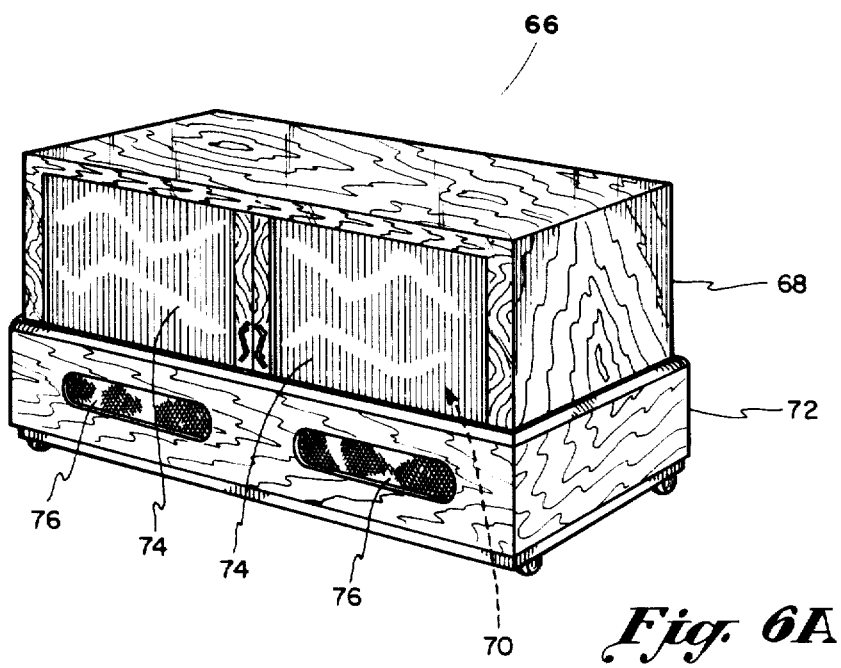
FIGS. 6A and 6B are views in perspective of another embodiment of a projection television system according to the invention showing, respectively, the viewing screen in the stored and unstored positions.
Figure 6B:
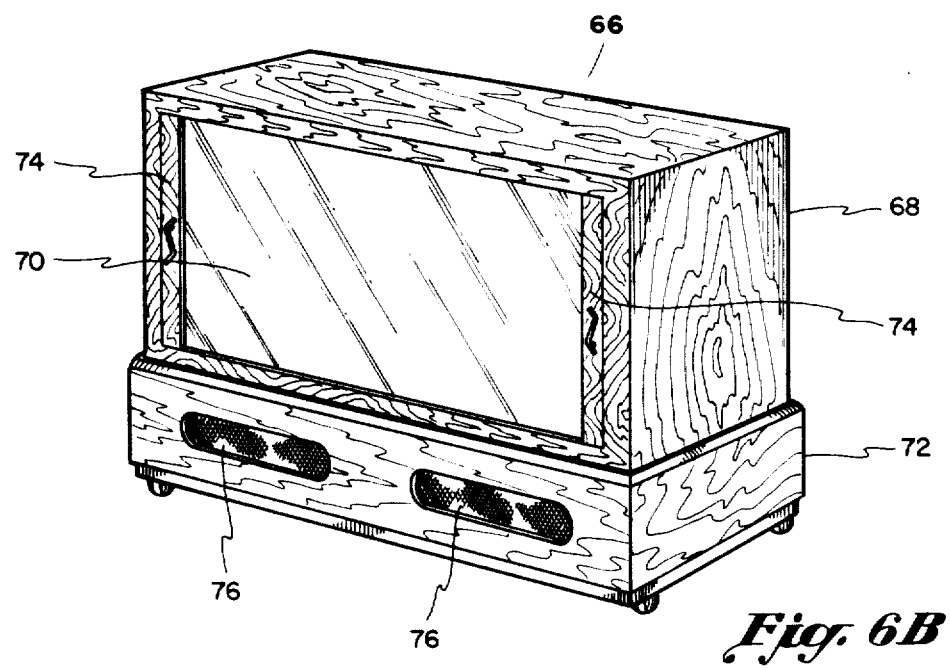

FIGS. 6A and 6B show another embodiment of an ultra-compact projection television receiver according to the invention. This embodiment comprises a collapsible receiver 66 having two piece cabinet means for enclosing the components of the receiver. The optical assembly may be substantially similar to the optical assembly described in connection with the preferred embodiment of the invention, as depicted in FIGS. 2, 3 and 4A-4B. The cabinet means comprise a first elevatable upper cabinet section 68 including at the front thereof rear projection screen means 70. A second, larger, open-top lower cabinet section 72 provides for accepting and storing at least part of the first cabinet section 68. Receiver 66 includes means for elevating upper cabinet section 68 and screen means 70 from a first receiver-inoperable position depicted in FIG. 6A. When in the inoperable position, screen means 70 is substantially stored in lower cabinet section 72 and receiver 66 is substantially as compact as a conventional, large-screen, console television receiver. When upper cabinet section 68 is elevated by the elevating means as depicted by FIG. 6B, receiver 66 when screen means 70 is in the receiver-operable position, is capable of displaying an image with an area greater than three times the image area of the aforesaid console television receiver. The means for elevating upper cabinet section 68 may be substantially similar to that described in connection with FIG. 5.

With reference now to FIG. 6A wherein screen means 70 is stored in lower cabinet section 72, screen means 70 may be concealed by tambour doors 74, as depicted. Two grill-cloth covered apertures 76 provide ports for a stereo speaker system. As with the embodiment depicted in FIGS. 1-4, vents are provided in the bottom of the cabinet for the influx and efflux of air during the excursion of upper cabinet section 68.

To suppress reflection of light in the interior of the cabinet, all components and assemblies within the cabinet are preferably finished to provide a matte black non-reflective surface. Similarly, the inside walls of the cabinet are preferably matte black.

Exemplary dimensional height (H), width (W) and depth (D) values of the cabinet 12 of the projection television receiver 10 according to the preferred embodiment of the invention shown by FIGS. 1-4 are listed as follows. It is to be recognized that the values are by way of example only, and are intended to be in no way limiting. The dimensional values are in inches.

Cabinet (12)
Screen stored: 31H × 44W × 19.5D
Height, screen elevated: 58
Cabinet Extension (41)
26.5H × 42W × 8.5D
Lid (14)
44W × 20D
Control Panel Cover (18)
6H × 38W
Elevatable Assembly (22)
Shroud (40)
22H × 40W
Depth, at top: 12
Depth, at bottom: 23.5
Screen (24)
Diagonal Measure: 45

Exemplary dimensions in inches of the embodiment of the invention depicted by FIGS. 6A and 6B are as follows:

Cabinet, collapsed
32H × 44W × 20D
Cabinet, screen elevated
50H × 44W × 20D
Screen (70)
Diagonal measure: 45

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

We claim:

1. An ultra-compact, rear projection television receiver having a folded optical path which includes a first stationary planar mirror and a second mirror, said receiver comprising:
- an open-topped, jack-in-the-box-like cabinet for enclosing components of said receiver and having lid means hinged to the top of said cabinet;
- a unitary opto-mechanical assembly, supported for vertical elevation within said cabinet and selectively storable in said cabinet, comprising a rear projection screen and said second mirror,
- said screen and said second mirror constituting at least a portion of said folded optical path,
- said assembly maintaining said second mirror in a fixed spaced relation to said screen for establishing an optical alignment integrity between said constituted portion of said folded optical path and said planar mirror and for insuring repeatablility of said alignment integrity upon subsequent elevations of said assembly; and
- means for lifting said lid and elevating said unitary opto-mechanical assembly from a first receiver-inoperable position, wherein said opto-mechanical assembly is stored in said cabinet and said receiver is rendered substantially as compact as a conventional large-screen console television receiver, to a second receiver-operable position, wherein said opto-mechanical assembly is elevated to extend from said cabinet, so that said receiver, when said assembly is in said receiver-operable position, is capable of displaying an image having an area greater than three times the image area that a conventional console television receiver is capable of displaying.

2. An ultra-compact collapsible rear projection television receiver having a folded optical path which includes a first stationary planar mirror and a second mirror, said receiver comprising:
- a two-piece, box-like cabinet for enclosing components of said receiver comprising a first elevatable closed top upper section and a second open-top lower section large enough to receive and store at least part of said first cabinet section and providing a platform base for said planar mirror,
- a unitary opto-mechanical assembly, mounted within said upper cabinet section, comprising a rear projection screen and said second mirror,
- said screen and said second mirror constituting at least a portion of said folded optical path,
- said assembly maintaining said second mirror in a fixed spaced relation to said screen for establishing an optical alignment integrity between said constituted portion of said folded optical path and said planar mirror and for insuring repeatability of said alignment integrity upon subsequent elevations of said assembly; and
- means for elevating said upper cabinet section to transport said unitary opto-mechanical assembly from a first receiver-inoperable position, wherein said upper cabinet section and said opto-mechanical assembly are stored in said lower section of said cabinet and said receiver is rendered substantially as compact as a conventional large-screen console television receiver, to a second receiver-operable position, wherein said upper cabinet section and said opto-mechanical assembly are elevated to extend from said cabinet, so that said receiver, when said upper cabinet section and said assembly are in said receiver-operable position, is capable of displaying an image having an area greater than three times the image area that a conventional console television receiver is capable of displaying.

* * * * *